US012693387B2

(12) United States Patent (10) Patent No.: US 12,693,387 B2
Nagaya et al. (45) Date of Patent: Jul. 28, 2026

(54) SCANNING DEVICE AND DISTANCE MEASURING DEVICE

(71) Applicants: KYOCERA Corporation, Kyoto (JP); KYOCERA Document Solutions Inc., Osaka (JP)

(72) Inventors: Tatsuya Nagaya, Moriyama (JP); Hiroki Okada, Machida (JP); Daisuke Takahashi, Neyagawa (JP); Hideji Mizutani, Osaka (JP)

(73) Assignees: KYOCERA Corporation, Kyoto (JP); KYOCERA Document Solutions Inc., Osaka (JP)

( * ) Notice: Subject to any disclaimer, the term of this patent is extended or adjusted under 35 U.S.C. 154(b) by 994 days.

(21) Appl. No.: 17/905,852

(22) PCT Filed: Mar. 3, 2021

(86) PCT No.: PCT/JP2021/008256
§ 371 (c)(1),
(2) Date: Sep. 8, 2022

(87) PCT Pub. No.: WO2021/187119
PCT Pub. Date: Sep. 23, 2021

(65) Prior Publication Data
US 2023/0120686 A1 Apr. 20, 2023

(30) Foreign Application Priority Data
Mar. 19, 2020 (JP) ................................. 2020-049980

(51) Int. Cl.
*G01S 7/481* (2006.01)

(52) U.S. Cl.
CPC .......... *G01S 7/4817* (2013.01); *G01S 7/4815* (2013.01); *G01S 7/4816* (2013.01); *G01S 7/4818* (2013.01)

(58) Field of Classification Search
CPC ............................. G01S 7/4815; H01S 3/2391
See application file for complete search history.

(56) References Cited

U.S. PATENT DOCUMENTS

| | | | | |
|---|---|---|---|---|
| 10,545,238 B1 * | 1/2020 | Rezk | ....................... | G01S 17/42 |
| 2006/0066836 A1 | 3/2006 | Bridges et al. | | |

(Continued)

FOREIGN PATENT DOCUMENTS

| | | |
|---|---|---|
| CN | 106248347 A | 12/2016 |
| CN | 107632297 A | 1/2018 |

(Continued)

*Primary Examiner* — Christopher D Hutchens
(74) *Attorney, Agent, or Firm* — Studebaker Brackett PLLC

(57) ABSTRACT

Provided is a scanning device including a first irradiation unit, a second irradiation unit, a scanning unit, a waveguide unit, and a detection unit. The first irradiation unit radiates a first electromagnetic wave for scanning an object of interest. The second irradiation unit radiates a second electromagnetic wave. The scanning unit deflects and outputs the first electromagnetic wave radiated by the first irradiation unit and the second electromagnetic wave radiated by the second irradiation unit. The waveguide unit guides at least part of the second electromagnetic wave, output by the scanning unit, in a different direction from the first electromagnetic wave. The detection unit detects the second electromagnetic wave guided in the different direction from the first electromagnetic wave by the waveguide unit.

13 Claims, 5 Drawing Sheets

(56)     References Cited

U.S. PATENT DOCUMENTS

| | | | |
|---|---|---|---|
| 2012/0299764 A1 | 11/2012 | Haneda et al. | |
| 2016/0377721 A1* | 12/2016 | Lardin | G01S 17/58 |
| | | | 356/5.09 |
| 2017/0038458 A1* | 2/2017 | Sugawara | G01S 17/931 |
| 2019/0204419 A1 | 7/2019 | Baba et al. | |
| 2019/0212451 A1* | 7/2019 | Viswanathan | G01S 7/4868 |
| 2020/0057151 A1* | 2/2020 | Finkelstein | G01S 7/4913 |
| 2020/0284883 A1* | 9/2020 | Ferreira | G01S 7/4815 |
| 2021/0096442 A1* | 4/2021 | Kempf | G02F 1/292 |
| 2021/0396848 A1* | 12/2021 | Han | G02B 27/10 |
| 2025/0306204 A1* | 10/2025 | Keller | G01S 17/34 |

FOREIGN PATENT DOCUMENTS

| | | | |
|---|---|---|---|
| JP | 2011-220732 A | 11/2011 | |
| JP | 2015-132762 A | 7/2015 | |
| JP | 2015-184548 A | 10/2015 | |

* cited by examiner

SCANNING DEVICE AND DISTANCE MEASURING DEVICE

CROSS-REFERENCE TO RELATED APPLICATIONS

This application claims priority of Japanese Patent Application No. 2020-49980 filed in Japan on Mar. 19, 2020, and the entire disclosure of this application is hereby incorporated by reference.

TECHNICAL FIELD

The present invention relates to a scanning device and a distance measuring device.

BACKGROUND OF INVENTION

In recent years, devices that acquire information relating to, for example, objects in the surrounding area from results obtained by detecting electromagnetic waves have been developed. For example, a known device uses a laser radar to measure the position of an object within an image captured by an infrared camera (for example, refer to Patent Literature 1). As an example of a scanning device that scans electromagnetic waves, a known scanning device deflects electromagnetic waves radiated from an irradiation unit by reflecting the waves with a reflecting mirror (for example, refer to Patent Literature 2).

CITATION LIST

Patent Literature

Patent Literature 1: Japanese Unexamined Patent Application Publication No. 2011-220732
Patent Literature 2: Japanese Unexamined Patent Application Publication No. 2015-132762

SUMMARY

In an embodiment, a scanning device includes a first irradiation unit, a second irradiation unit, a scanning unit, a waveguide unit, and a detection unit. The first irradiation unit is configured to radiate a first electromagnetic wave for scanning an object of interest. The second irradiation unit is configured to radiate a second electromagnetic wave. The scanning unit is configured to deflect and output the first electromagnetic wave radiated by the first irradiation unit and the second electromagnetic wave radiated by the second irradiation unit. The waveguide unit is configured to guide at least part of the second electromagnetic wave output by the scanning unit in a different direction from the first electromagnetic wave. The detection unit is configured to detect the second electromagnetic wave guided in the different direction from the first electromagnetic wave by the waveguide unit.

In an embodiment, a distance measuring device includes an operation device according to an embodiment.

In an embodiment, a scanning device includes a scanning unit, a waveguide unit, and a detection unit. The scanning unit is configured to deflect an electromagnetic wave entered. The waveguide unit is configured to separate the electromagnetic wave deflected by the scanning unit into a first electromagnetic wave and a second electromagnetic wave. The detection unit is configured to detect the second electromagnetic wave separated by the waveguide unit. The detection unit is disposed at a position outside the irradiation range of the first electromagnetic wave separated by the waveguide unit from the electromagnetic wave deflected by the scanning unit.

As described above, a solution of the present disclosure is described in the form of a scanning device and a distance measuring device. The present disclosure can also be realized in forms including these devices and furthermore can be realized as a method, a program, or a storage medium recording a program substantially equivalent to these devices, and note that the scope of the present disclosure includes these forms as well.

DESCRIPTION OF EMBODIMENTS

Figure 1:
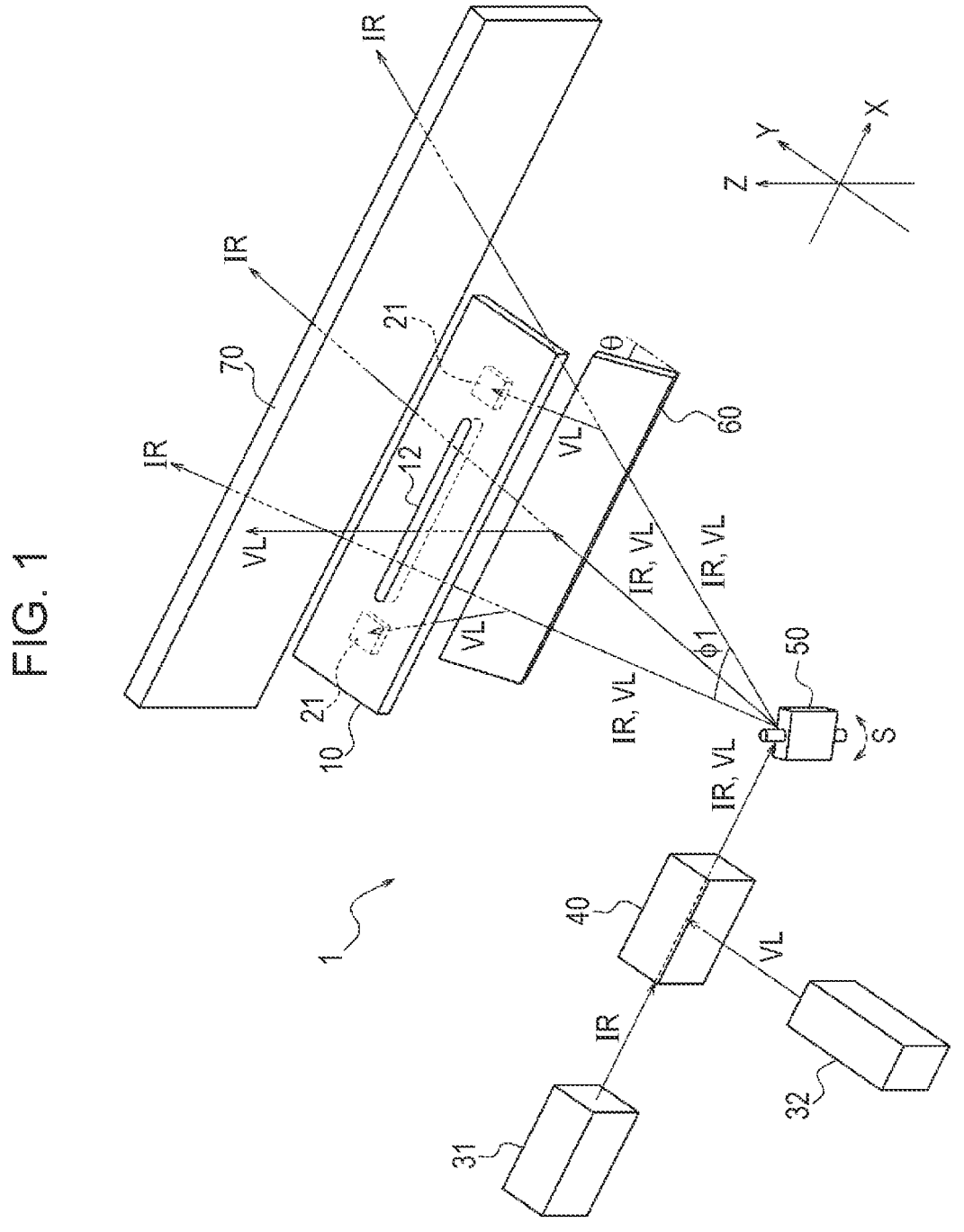
FIG. 1 is a diagram illustrating a schematic configuration of a scanning device according to an embodiment.

In a scanning device that scans electromagnetic waves, a reflecting mirror that deflects the electromagnetic waves is rotationally driven using, for example, an electromechanical conversion element based on micromachining technologies. In such a device, a sensor such as a photodiode that detects electromagnetic waves deflected by the reflecting mirror may be used to detect the swing angle of the rotationally driven reflecting mirror. Such a sensor needs to be disposed at a position where electromagnetic waves deflected by the reflecting mirror can be detected by the sensor. Therefore, in a scanning device that performs scanning using electromagnetic waves, the range across which electromagnetic waves are radiated (scannable range) may be restricted depending on the position at which the sensor for detecting the swing angle of the reflecting mirror is disposed. The present disclosure provides a scanning device and a distance measuring device that can secure or expand a range to be irradiated with electromagnetic waves. According to an embodiment, a scanning device and a distance measuring device can secure or expand a range to be irradiated with electromagnetic waves. In an embodiment, a scanning device is described below while referring to the drawings.

Figure 2:
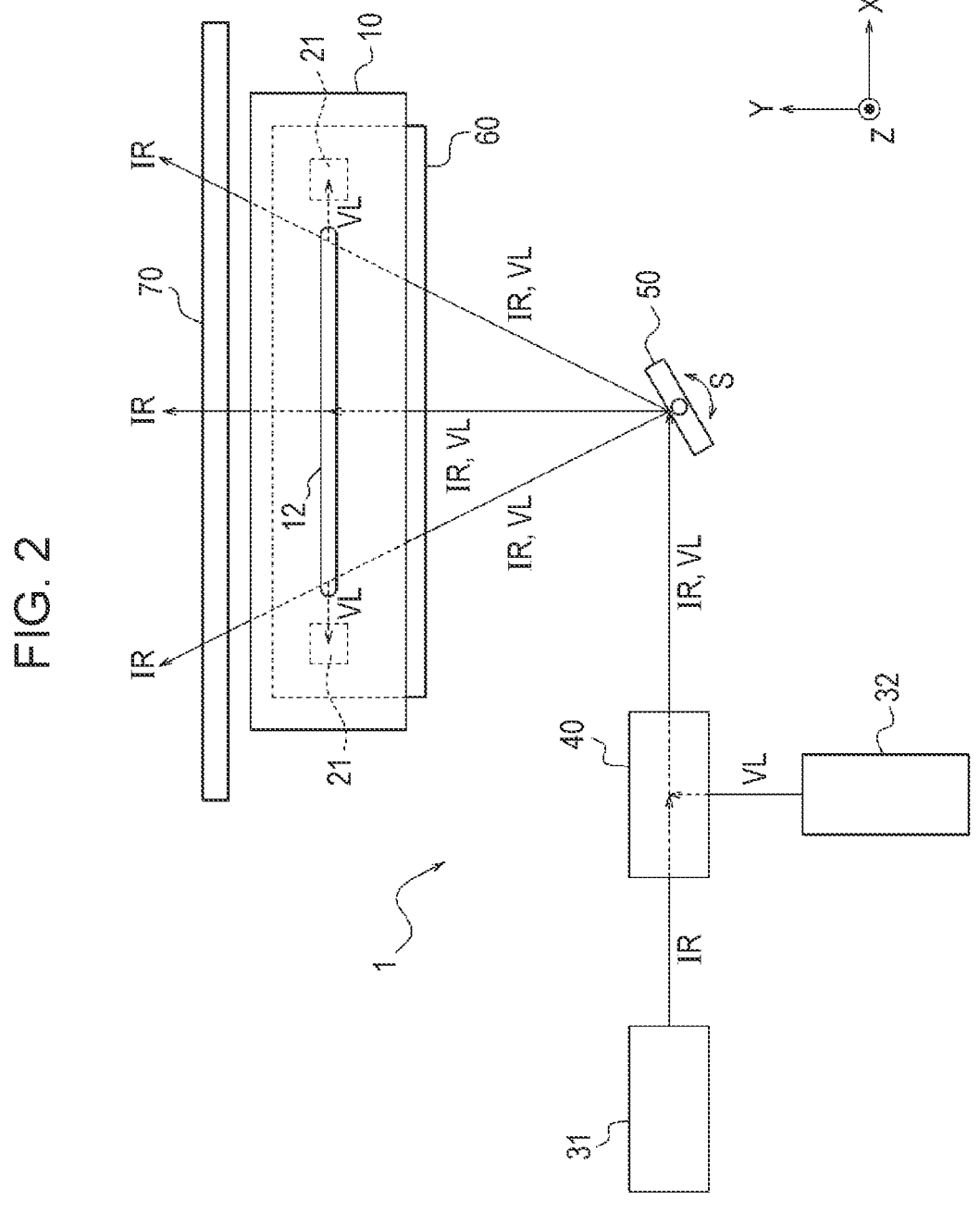
FIG. 2 is a diagram illustrating the schematic configuration of the scanning device illustrated in FIG. 1 from another perspective.
Figure 3:
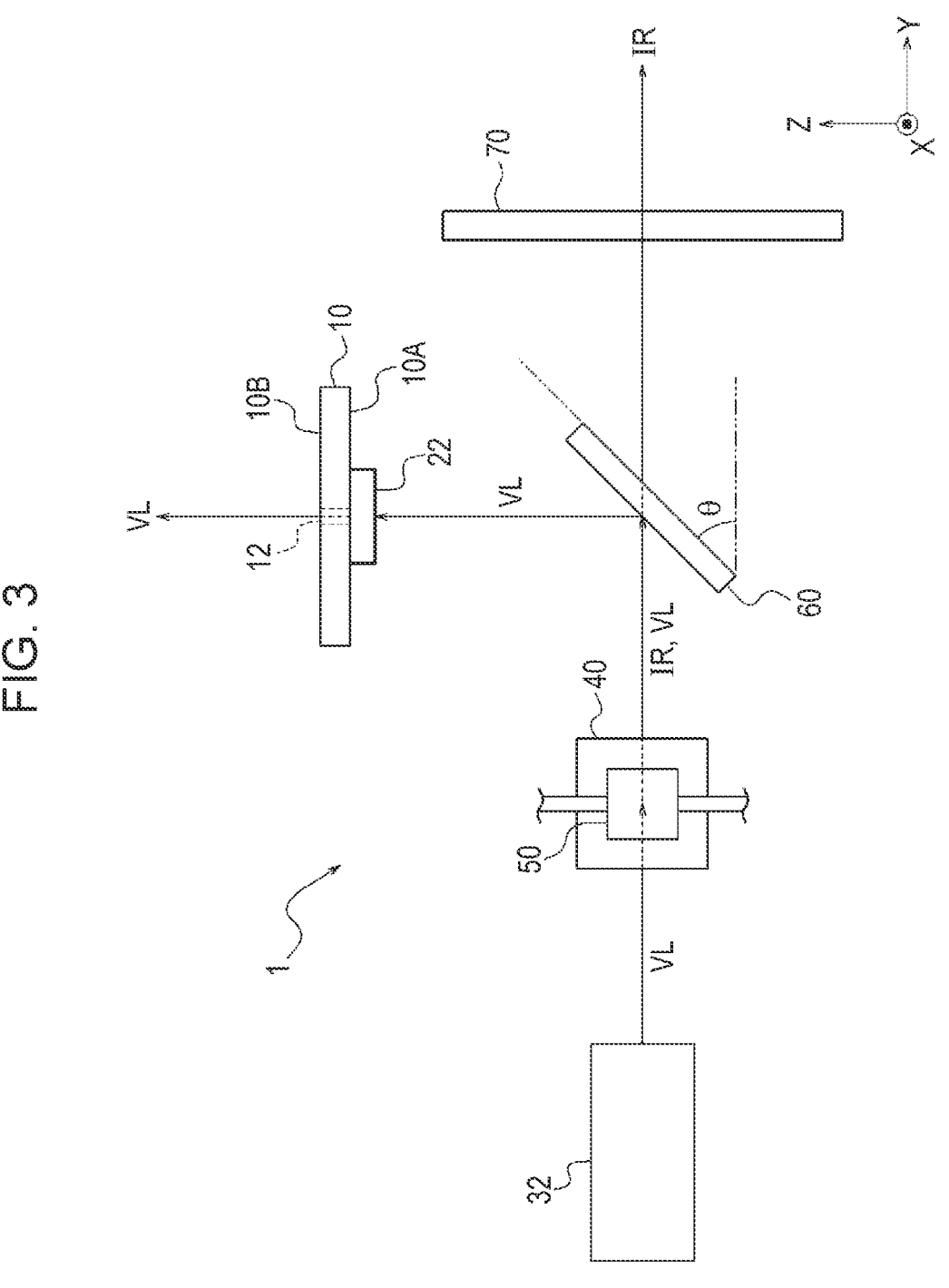
FIG. 3 is a diagram illustrating the schematic configuration of the scanning device illustrated in FIG. 1 from another perspective.

FIGS. 1 to 3 illustrate the schematic configuration of a scanning device according to an embodiment. FIG. 1 is a perspective view illustrating the schematic configuration of the scanning device according to an embodiment. FIG. 2 is a view (plan view) of the schematic configuration of the scanning device illustrated in FIG. 1 from a different perspective from FIG. 1. FIG. 3 illustrates the schematic configuration (right side view) of the scanning device illustrated in FIGS. 1 and 2 from a different perspective from FIGS. 1 and 2.

For the coordinate axes illustrated in FIGS. 1 to 3, a positive X-axis direction corresponds to a rightward direction in FIG. 2 and a negative X-axis direction corresponds to a leftward direction in FIG. 2. For the coordinate axes illustrated in FIGS. 1 to 3, a positive Y-axis direction corresponds to a rearward direction in FIG. 1 (the direction of travel of electromagnetic waves reflected by a reflecting mirror) and a negative Y-axis direction corresponds to a forward direction in FIG. 1. For the coordinate axes illustrated in FIGS. 1 to 3, a positive Z-axis direction corresponds to an upward direction in FIG. 3 and a negative Z-axis direction corresponds to a downward direction in FIG. 3.

As illustrated in FIGS. 1 to 3, in an embodiment, a scanning device 1 may include a substrate 10, a first detection unit 21, a second detection unit 22, a first irradiation unit 31, a second irradiation unit 32, a combining unit 40, a scanning unit 50, a waveguide unit 60, and an emitting unit 70. In an embodiment, the scanning device 1 may include all of the functional units described above, may include functional units other than those described above, and does not necessarily include some of the functional units described above.

In FIGS. 1 to 3, the functional units described above are separated from each other to a sufficient degree to allow convenience of explanation. When actually configuring the scanning device 1 according to an embodiment, the functional units included in the scanning device 1 may be more densely arranged than is illustrated in FIGS. 1 to 3. For example, the functional units of the scanning device 1 may be disposed to be compactly configured to fit within an area of around a few square centimeters.

In FIGS. 1 to 3, arrows projecting from the individual functional blocks represent beams of electromagnetic waves. The functional blocks illustrated in FIGS. 1 to 3 may be connected to various functional units that control and/or drive the functional blocks in a wired or wireless manner as appropriate. In FIGS. 1 to 3, for convenience of explanation, the various functional units that control and/or drive the functional blocks are omitted. Furthermore, the functional blocks illustrated in FIGS. 1 to 3 may be connected to functional units that supply power to the functional blocks as appropriate. In FIGS. 1 to 3, the functional units that supply power to the functional blocks are omitted for convenience of explanation. The functional blocks illustrated in FIGS. 1 to 3 may be fixed and/or positioned at the positions illustrated in the figures as appropriate. In FIGS. 1 to 3, various components used to fix in place and/or position the functional blocks are omitted for convenience of explanation.

In an embodiment, the scanning device 1 can radiate electromagnetic waves and deflect and output the radiated electromagnetic waves, as further described below. At least a portion of the electromagnetic waves deflected by the scanning device 1 may be reflected by a predetermined object of interest (such as an object). The electromagnetic waves (reflected waves) reflected by the predetermined object or the like may be detected by, for example, an electromagnetic wave detection device. The scanning device 1 of an embodiment and the electromagnetic wave detection device as described above may be included in an information acquisition system (for example, a distance measuring device) according to an embodiment. In other words, in an embodiment, the distance measuring device may include the scanning device 1 according to an embodiment and may measure the distance to an object of interest. In an embodiment, an information acquisition system may, for example, employ a light detection and ranging, laser image detection and ranging (LIDAR) technology used for "light detection and distance measurement" or "laser image detection and distance measurement". In an information acquisition system according to an embodiment, for example, the distance to a relatively distant object and/or a property of the object may be analyzed by measuring scattered light with respect to pulsed laser radiation.

As illustrated in FIGS. 1 and 2, in the scanning device 1, the substrate 10 may be a substrate in which the X-axis direction is a longitudinal direction thereof and the Y-axis direction is a lateral direction thereof. As illustrated in FIG. 3, the substrate 10 may be a substrate having a thickness in the Z-axis direction. As illustrated in FIGS. 1 to 3, the substrate 10 may be fixed in place in the scanning device 1 to be parallel to the XY plane. As illustrated in FIG. 3, the substrate 10 has a first surface 10A and a second surface 10B. The first surface 10A of the substrate 10 may be the surface of the substrate 10 facing in the negative Z-axis direction, i.e., the downward facing surface of the substrate 10. The second surface 10B of the substrate 10 may be the surface of the substrate 10 that facing in the positive Z-axis direction, i.e., the upward facing surface of the substrate 10. Thus, the substrate 10 may have the first surface 10A and the second surface 10B on the opposite side from the first surface 10A.

In an embodiment, the substrate 10 may be, for example, a plate-shaped member made of an insulator. The substrate 10 may be a plate-shaped member made of an insulator with conductor wiring on the surface of or inside the plate-shaped member. In other words, the substrate 10 may be a printed wiring board (PWB) in a state prior to disposing electronic components attached thereto. On the other hand, the substrate 10 may be a printed circuit board (PCB) in which electronic components have soldered to the printed circuit board so that the printed circuit board can operate as an electronic circuit.

The substrate 10 may be any of various substrates defined in JIS standard JISC5603 or IEC60194. For example, the substrate 10 may be a printed circuit, printed wiring, a printed circuit board, a printed circuit assembly, a printed wiring board, or a printed board.

In the following description, the substrate 10 is a rigid substrate. However, the substrate 10 is not limited to being a rigid substrate and may be, for example, a rigid-flexible substrate (flex-rigid) or a flexible substrate (FPC).

As illustrated in FIGS. 1 to 3, the substrate 10 may include a passage portion 12. The passage portion 12 of the substrate 10 is further described below.

The first and second detection units 21 and 22 may be provided on the first surface 10A of the substrate 10, i.e., the downward facing surface of the substrate 10, as illustrated in FIG. 3. Since FIG. 3 illustrates the right side of the scanning device 1, only the second detection unit 22 is illustrated, and the first detection unit 21 is not illustrated. In FIGS. 1 and 2, the first and second detection units 21 and 22 are located at positions where the first and second detection units 21 and 22 cannot be seen and are therefore illustrated using dashed lines.

The first detection unit 21 and the second detection unit 22 may detect predetermined electromagnetic waves. In an embodiment, the first detection unit 21 may detect, for example, visible light incident on the first detection unit 21. In an embodiment, the second detection unit 22 may detect, for example, visible light incident on the second detection unit 22. In FIGS. 1 to 3, the detection surfaces at which electromagnetic waves are detected by the first detection unit 21 and the second detection unit 22 may be surfaces facing in the negative Z-axis direction, i.e., the downward facing surfaces of the first detection unit 21 and the second detection unit 22. As illustrated in FIGS. 1 and 3, the first detection unit 21 may detect, for example, visible light VL (hereinafter, also referred to as electromagnetic waves VL) incident on the first detection unit 21. The same as and/or similarly to the first detection unit 21, the second detection unit 22 may detect, for example, visible light VL incident on the second detection unit 22.

The first detection unit 21 and the second detection unit 22 may be, for example, photodiodes (PDs), which are semiconductor diodes functioning as photodetectors. As described below, the first detection unit 21 and the second detection unit 22 may each detect electromagnetic waves that are scanned (deflected) by the scanning unit 50. Thus, the first detection unit 21, which detects electromagnetic waves, and the second detection unit 22, which detects electromagnetic waves, may be provided on the first surface 10A of the substrate 10. The positions where the first detection unit 21 and the second detection unit 22 are provided on the first surface 10A of the substrate 10 are further described below.

The first detection unit 21 and the second detection unit 22 are provided as two detection units on the substrate 10 illustrated in FIGS. 1 to 3. Hereinafter, when not specifically distinguishing between the first detection unit 21 and the second detection unit 22, the first detection unit 21 and the second detection unit 22 may simply be referred to as "detection unit 20" or "detection units 20". In an embodiment, the number of detection units provided on the substrate 10 is not limited to two. For example, in the scanning device 1 according to an embodiment, the substrate 10 may be provided with only one detection unit 20, such as the first detection unit 21 or the second detection unit 22. In the scanning device 1 according to an embodiment, the substrate 10 may be provided with three or more detection units 20, each being the first detection unit 21 or the second detection unit 22. As described above, the detection units 20 may each include a photodiode that detects the visible light VL radiated by the second irradiation unit 32.

The first irradiation unit 31 may radiate predetermined first electromagnetic waves. In an embodiment, the first irradiation unit 31 may radiate, for example, infrared radiation as electromagnetic waves for scanning a predetermined object of interest. As illustrated in FIGS. 1 and 2, the direction in which the first irradiation unit 31 radiates the first electromagnetic waves may be, for example, the positive X-axis direction, i.e., to the right in FIG. 2. As illustrated in FIGS. 1 and 2, the first irradiation unit 31 may radiate the infrared radiation IR (hereinafter also referred to as electromagnetic waves IR), for example, in the positive X-axis direction toward the combining unit 40. Therefore, the first irradiation unit 31 may be positioned and/or fixed in place so that the infrared radiation IR radiated by the first irradiation unit 31 is incident on the combining unit 40.

The first irradiation unit 31 may be a laser diode (LD) or a diode laser, which is a semiconductor laser that functions as a laser using semiconductor recombination emission, for example. Thus, the first irradiation unit 31 may include a laser diode that radiates infrared radiation as the first electromagnetic waves. The first irradiation unit 31 may, for example, radiate pulsed electromagnetic waves. In the scanning device 1, the first irradiation unit 31 may be an array including, for example, a plurality of laser diodes.

The second irradiation unit 32 may radiate predetermined second electromagnetic waves. In an embodiment, the second irradiation unit 32 may radiate visible light, for example, as electromagnetic waves for detecting the irradiation direction of the electromagnetic waves used for scanning (i.e., the swing angle of the reflecting mirror). As illustrated in FIGS. 1 to 3, the direction in which the second irradiation unit 32 radiates the second electromagnetic waves may be, for example, the positive Y-axis direction, i.e., the rearward direction in FIG. 1. As illustrated in FIGS. 1 to 3, the second irradiation unit 32 may radiate the visible light VL, for example, in the positive Y-axis direction toward the combining unit 40. Therefore, the second irradiation unit 32 may be positioned and/or fixed in place so that the visible light VL radiated by the second irradiation unit 32 is incident on the combining unit 40. The visible light VL may be red, for example, to improve visibility.

The second irradiation unit 32 may be, for example, a laser diode (LD) or a diode laser, which is a semiconductor laser that functions as a laser using semiconductor recombination emission. The second irradiation unit 32 may be a light-emitting diode (LED) that radiates visible light. Thus, the second irradiation unit 32 may include a laser diode that radiates visible light as the second electromagnetic waves. The second irradiation unit 32 may, for example, radiate steady light.

The combining unit 40 outputs, in a predetermined direction, two sets of electromagnetic waves input from different directions. Specifically, the combining unit 40 may combine the first electromagnetic waves radiated from the first irradiation unit 31 and the second electromagnetic waves radiated from the second irradiation unit 32 by matching their optical axes. The combining unit 40 may then output the combined electromagnetic waves toward the scanning unit 50. As illustrated in FIGS. 1 and 2, the combining unit 40 may combine the infrared radiation IR input from the first irradiation unit 31 and the visible light VL input from the second irradiation unit 32 and output the combined electromagnetic waves IR and VL to the scanning unit 50. Therefore, the combining unit 40 may be positioned and/or fixed in place so that the infrared radiation IR radiated from the first irradiation unit 31 is incident thereon. The combining unit 40 may be positioned and/or fixed in place so that the visible light VL radiated from the second irradiation unit 32 is incident thereon. Thus, the combining unit 40 may be positioned so that the first electromagnetic waves (infrared radiation IR) radiated by the first irradiation unit 31 and the second electromagnetic waves (visible light VL) radiated by the second irradiation unit 32 are incident thereon. Furthermore, the combining unit 40 may be positioned and/or fixed in place so that the combined electromagnetic waves IR and VL are incident on the scanning unit 50.

The combining unit 40 may include, for example, a prism or a cold mirror. Any configuration may be adopted for the combining unit 40 as long as the combining unit 40 is able to match the directions of travel of the first electromagnetic waves radiated from the first irradiation unit 31 and the second electromagnetic waves radiated from the second irradiation unit 32 and output the resulting electromagnetic waves in a predetermined direction. Thus, the combining unit 40 may have a function of matching the direction of travel of the first electromagnetic waves (infrared radiation IR) and the direction of travel of the second electromagnetic waves (visible light VL) with each other.

In FIGS. 1 to 3, the combining unit 40 may combine the first electromagnetic waves radiated from the first irradiation unit 31 and the second electromagnetic waves radiated from the second irradiation unit 32 as coaxial electromagnetic waves and then output the combined electromagnetic waves as coaxial electromagnetic waves in a predetermined direction. The combining unit 40 does not necessarily combine the first electromagnetic waves radiated from the first irradiation unit 31 and the second electromagnetic waves radiated from the second irradiation unit 32 into coaxial electromagnetic waves. However, it is desirable that the directions of travel of the first electromagnetic waves and the second electromagnetic waves match. In FIGS. 1 to 3, the combining unit 40 combines electromagnetic waves radiated from mutually perpendicular directions such as the first electromagnetic waves radiated from the first irradiation unit 31 and the second electromagnetic waves radiated from the second irradiation unit 32. In FIGS. 1 to 3, the combining unit 40 may transmit the first electromagnetic waves radiated from the first irradiation unit 31 and reflect the second electromagnetic waves radiated from the second irradiation unit 32 in the direction in which the first electromagnetic waves are transmitted. As a result, the first and second electromagnetic waves are combined in the combining unit 40 such that their directions of travel match. The combining unit 40 outputs the combined electromagnetic waves in the same direction as the first electromagnetic waves radiated from the first irradiation unit 31, i.e., in the positive X-axis direction. It is acceptable that the combining unit 40 output the first electromagnetic waves radiated from the first irradiation unit 31 toward the scanning unit 50 and also output the second electromagnetic waves radiated from the second irradiation unit 32 toward the scanning unit 50, and the directions of travel of the first and second electromagnetic waves do not necessarily need to match.

The scanning unit 50 deflects and then outputs the electromagnetic waves input from the combining unit 40. The scanning unit 50 may include, for example, a reflecting mirror that deflects the incident electromagnetic waves. The reflecting mirror of the scanning unit 50 may be, for example, a micro electro mechanical systems (MEMS) mirror, a polygon mirror, or galvano mirror. The reflecting mirror of the scanning unit 50 is described below as including a MEMS mirror.

As illustrated in FIGS. 1 to 3, the scanning unit 50 has a rotation axis that is parallel to the Z-axis and the scanning unit 50 rotates around this axis in a lateral direction. The rotational motion is not necessarily circumferential motion. For example, the rotational motion may be oscillating motion that includes, as part thereof, rotational motion (for example, less than one complete revolution). As illustrated in FIGS. 1 and 2, the scanning unit 50 may rotationally move in the directions indicated by arrow S.

As illustrated in FIGS. 1 and 2, the scanning unit 50 may deflect the electromagnetic waves IR and VL input from the combining unit 40 toward, for example, the waveguide unit 60 by rotationally moving as indicated by the arrow S. As illustrated in FIGS. 1 to 3, the paths of the electromagnetic waves IR and VL deflected by the scanning unit 50 may lie on a plane parallel to the XY plane. As illustrated in FIGS. 1 and 2, the scanning unit 50 may be positioned so that the electromagnetic waves IR and VL radiated from the combining unit 40 are incident thereon. The scanning unit 50 may also be positioned such that the electromagnetic waves IR and VL deflected by the scanning unit 50 are incident on the waveguide unit 60.

Thus, the scanning unit 50 may change and then output the first electromagnetic waves (infrared radiation IR) radiated by the first irradiation unit 31 and the second electromagnetic waves (visible light VL) radiated by the second irradiation unit 32. The scanning unit 50 may scan the first electromagnetic waves (infrared radiation IR) and the second electromagnetic waves (visible light VL) output from the combining unit 40.

Out of the incident electromagnetic waves, the waveguide unit 60 may reflect visible light and allow infrared light to pass therethrough. In other words, the waveguide unit 60 allows the first electromagnetic waves (infrared radiation IR) radiated by the first irradiation unit 31 to pass therethrough and reflects the second electromagnetic waves (visible light VL) radiated by the second irradiation unit 32. The waveguide unit 60 may include, for example, a cold mirror. Thus, the waveguide unit 60 may allow the infrared radiation IR radiated by the first irradiation unit 31 to pass therethrough and reflect the visible light VL radiated by the second irradiation unit 32. The waveguide unit 60 may have any configuration as long as the waveguide unit 60 can allow the first electromagnetic waves radiated by the first irradiation unit 31 to pass therethrough and reflect the second electromagnetic waves radiated by the second irradiation unit 32.

As illustrated in FIGS. 1 to 3, waveguide unit 60 allows the infrared radiation IR (or at least part of the infrared radiation IR) out of the electromagnetic waves IR and VL incident from scanning unit 50 to pass therethrough. As illustrated in FIGS. 1 to 3, the waveguide unit 60 reflects the visible light VL (or at least part of the visible light VL) out of the electromagnetic waves IR and VL incident from the scanning unit 50.

As illustrated in FIGS. 1 and 3, the waveguide unit 60 may be disposed to be inclined at a predetermined angle θ from a plane parallel to the XY plane. Being inclined at the angle θ allows the waveguide unit 60 to reflect, in the positive Z-axis direction, the visible light VL (or at least a portion of the electromagnetic waves VL) out of the electromagnetic waves IR and VL incident from the scanning unit 50. Thus, the waveguide unit 60 may guide at least a portion of the second electromagnetic waves (visible light VL), deflected by the scanning unit 50, in a different direction from the first electromagnetic waves (infrared radiation IR).

As illustrated in FIGS. 1 to 3, the waveguide unit 60 may be positioned and/or fixed in place so that the electromagnetic waves IR and VL scanned (deflected) by the scanning unit 50 are incident thereon. The waveguide unit 60 may be positioned and/or fixed in place so that the second electromagnetic waves (visible light VL) reflected by the waveguide unit 60 are directed toward the substrate 10. As described above, the first and second detection units 21 and 22 are disposed on the first surface 10A of the substrate 10. Accordingly, when the waveguide unit 60 is properly positioned, the waveguide unit 60 can guide the electromagnetic waves VL scanned by the scanning unit 50 toward at least one out of the first detection unit 21 and the second detection unit 22. Thus, the detection unit 20 may detect the second electromagnetic waves VL, which are guided in a different direction from the first electromagnetic waves (infrared radiation IR) by the waveguide unit 60.

The emitting unit 70 may emit from the scanning device 1 at least a portion of the first electromagnetic waves (infrared radiation IR) scanned by the scanning unit 50. More specifically, the emitting unit 70 may emit the first electromagnetic waves (infrared radiation IR) that have passed through the waveguide unit 60, out of the first electromagnetic waves (infrared radiation IR) and the second electromagnetic waves (visible light VL) scanned by the scanning unit 50.

The emitting unit 70 may be made of, for example, glass or acrylic to allow the first electromagnetic waves (infrared radiation IR) to entirely pass through the emitting unit 70. The emitting unit 70 may allow at least a portion of the first electromagnetic waves (infrared radiation IR) to pass through the emitting unit 70 only at a part thereof from which the first electromagnetic waves are to be emitted. In this case, the emitting unit 70 does not allow at least a portion of the first electromagnetic waves to pass the emitting unit 70 in parts thereof other than the part thereof from which the first electromagnetic waves (infrared radiation IR) are to be emitted. Thus, the emitting unit 70 may emit the first electromagnetic waves (infrared radiation IR) output by the scanning unit 50. In this case, the waveguide unit 60 may be positioned on a path of the first electromagnetic waves (infrared radiation IR) output by the scanning unit 50. The path extends up to the emitting unit 70 through which the first electromagnetic waves are emitted.

As described above, in the scanning device 1, the infrared radiation IR radiated from the first irradiation unit 31 is deflected by the scanning unit 50. The infrared radiation IR deflected by the scanning unit 50 is emitted from the scanning device 1 after passing through the waveguide unit 60 and the emitting unit 70 and can then be used to scan objects and so forth in the surrounding area.

In the scanning device 1, the visible light VL radiated from the second irradiation unit 32 is deflected by the scanning unit 50 together with the infrared radiation IR radiated from the first irradiation unit 31. The visible light VL radiated from the second irradiation unit 32 is reflected by the waveguide unit 60 in the positive Z-axis direction after being deflected by the scanning unit 50. The visible light VL reflected by the waveguide unit 60 can be detected by the first detection unit 21 and/or the second detection unit 22 depending on the deflection direction of the visible light VL deflected by the scanning unit 50, which moves in a rotational manner. Therefore, the scanning device 1 can detect the irradiation direction of the infrared radiation IR by detecting the angle of rotation (swing angle) of the scanning unit 50.

Thus, the scanning device 1 can cause the beams of visible light VL, out of the electromagnetic waves IR and VL scanned by the scanning unit 50, to be incident on the first detection unit 21 and/or the second detection unit 22. The scanning device 1 may store an angle detection table in which the angle of rotation of the reflecting mirror when the visible light VL reflected by the rotationally moving reflecting mirror is detected by the first detection unit 21 or the second detection unit 22 and the angle of rotation of the reflecting mirror with respect to the elapsed time from that state are associated with each other. In this way, the scanning device 1 can detect the angle of rotation of the scanning unit 50 (reflecting mirror) based on the elapsed time from respective timings at which the first detection unit 21 and the second detection unit 22 receive the light. Thus, the scanning device 1 can detect the irradiation direction of the infrared radiation IR. The scanning device 1 may include a controller (CPU), which is not illustrated, to perform processing for detecting the angle of rotation of the scanning unit 50. This controller may detect the state of the scanning unit 50 based on the detection of the second electromagnetic waves by the first detection unit 21 and/or the second detection unit 22. Thus, the scanning device 1 may include a controller that detects the state of the scanning unit 50 based on detection of the second electromagnetic waves by the first detection unit 21 and/or the second detection unit 22.

The scanning device 1 can detect, in a direction different from the irradiation direction of the infrared radiation IR used for scanning, the visible light VL to determine the swing angle of the infrared radiation IR used for scanning. In other words, in the scanning device 1, the detection unit for the visible light VL is not disposed in the irradiation range of the infrared radiation IR. Therefore, in the scanning device 1, a large scanning range can be set for scanning using the infrared radiation IR while reducing the size of the scanning device 1.

On the other hand, when the scanning device 1 is configured in this way, the first detection unit 21 and the second detection unit 22 need to be disposed on the downward-facing first surface 10A of the substrate 10 to detect the visible light VL, as illustrated in FIGS. 1 to 3. In this case, the first detection unit 21 and the second detection unit 22 may be disposed at positions on the substrate 10 such that the first and second detection units 21 and 22 cannot be seen from the upper side. As described above, in the scanning device 1, the first detection unit 21 and the second detection unit 22 need to be disposed at positions where the visible light VL scanned by the MEMS mirror of the scanning unit 50 is incident thereon. In other words, in the scanning device 1, the first detection unit 21 and the second detection unit 22 need to be accurately positioned at positions where the visible light VL can be detected. Depending on the structure of the scanning device 1, accurate positioning due to dimensional and/or assembly tolerances of the components may or may not be guaranteed unless the positions of the first and second detection units 21 and 22 are adjusted during assembly. The positions of the first detection unit 21 and the second detection unit 22 may or may not be adjusted visually when adjusting the positions of the first detection unit 21 and the second detection unit 22 during assembly of the scanning device 1. In this case, the visual positional adjustment of the first detection unit 21 and the second detection unit 22 with respect to the positions where the visible light VL will be incident is difficult.

Therefore, in the scanning device 1 according to an embodiment, the substrate 10 is employed that enables accurate and easy adjustment of the positions of the first detection unit 21 and the second detection unit 22 even when the first detection unit 21 and the second detection unit 22 are not visible during, for example, assembly. In an embodiment, the substrate 10 is further described below.

Figure 4A:
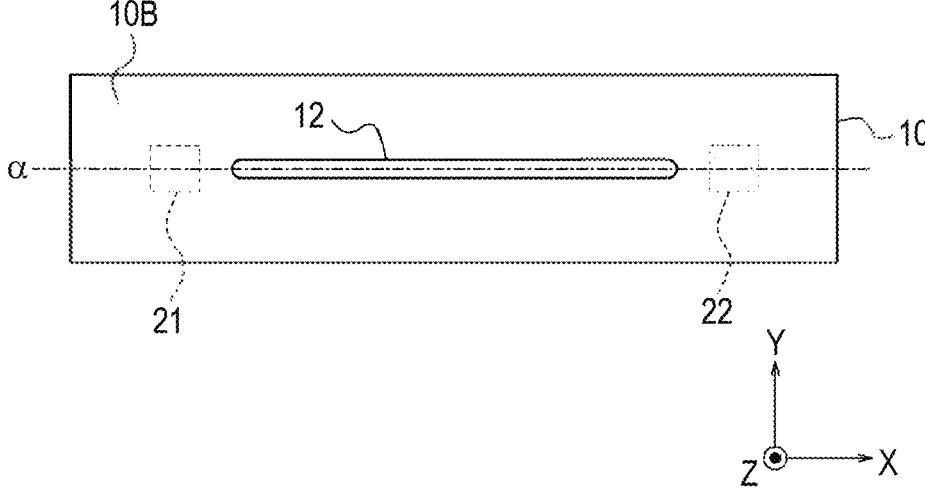
FIGS. 4A and 4B are diagrams illustrating a substrate including a detection unit according to an embodiment.
Figure 4B:
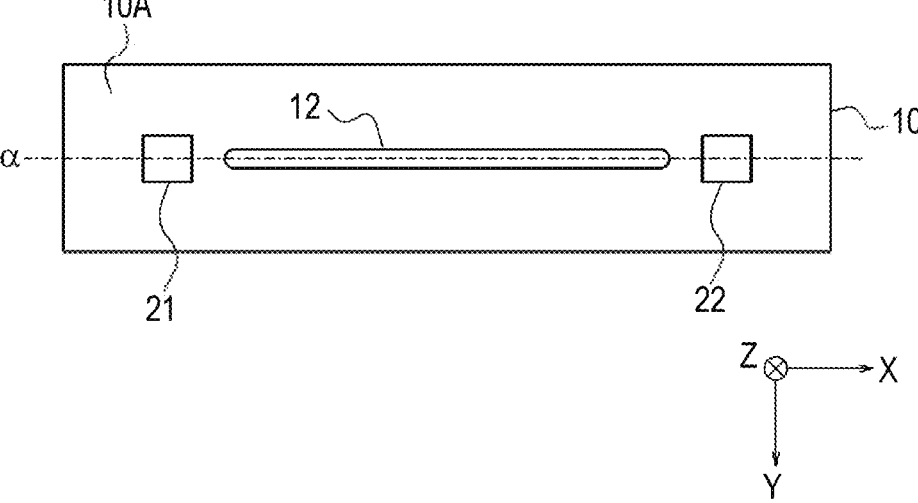

FIGS. 4A and 4B illustrate a substrate 10 according to an embodiment. FIGS. 4A and 4B illustrate the substrate 10 of the scanning device 1 illustrated in FIGS. 1 to 3. FIG. 4A illustrates the second surface 10B side of the substrate 10. FIG. 4B illustrates the first surface 10A side of the substrate 10.

The same as and/or similarly to FIGS. 1 and 2, FIG. 4A illustrates the substrate 10 from a viewpoint facing in the negative Z-axis direction, i.e., looking downward from above. In FIG. 4A, the first detection unit 21 and the second detection unit 22 are illustrated by dashed lines because the first detection unit 21 and the second detection unit 22 are at positions (on the rear side) where they cannot be seen.

FIG. 4B illustrates the substrate 10 from a viewpoint facing toward the positive Z-axis direction, i.e., looking upward from below. In FIG. 4B, the first detection unit 21 and the second detection unit 22 are illustrated by solid lines because they are at positions where they can be seen (on the front side).

As illustrated in FIGS. 4A and 4B, the substrate 10 may include a passage portion 12. In the substrate 10 according to an embodiment, the passage portion 12 may be, for example, a slit formed in the substrate 10. In other words, in this case, the passage portion 12 may be formed to penetrate through the substrate 10. The passage portion 12 may be formed to penetrate between the first surface 10A and the second surface 10B of the substrate 10. When the passage portion 12 is formed to penetrate through the substrate 10, a transparent resin plate or film may be provided in the passage portion 12 to make it easier to see the visible light VL passing through the passage portion 12.

As illustrated in FIG. 4B, the passage portion 12 may be provided at a position on a straight line α passing through the first detection unit 21 and the second detection unit 22 on the first surface 10A. In FIG. 4B, the straight line α is represented by a one-dot chain line as a virtual line. In this case, as illustrated in FIG. 4A, the passage portion 12 may be provided at a position corresponding to a position on the straight line α, which is a virtual line, on the second surface 10B. Thus, the first detection unit 21 and the second detection unit 22 are not disposed on the second surface 10B of the substrate 10, but the passage portion 12 may be provided at a position corresponding to positions of the first detection unit 21 and the second detection unit 22 on the straight line α, which is a virtual line.

When the passage portion 12 is a slit formed in the substrate 10, as illustrated in FIGS. 1 to 3, at least part of the visible light VL passes through the passage portion 12 when the visible light VL reflected by the waveguide unit 60 is guided to the passage portion 12. Therefore, when the infrared radiation IR is deflected by the scanning unit 50, the visible light VL, which is deflected along with the infrared radiation IR, can pass through the passage portion 12 after being reflected in the positive Z-axis direction by the waveguide unit 60. Thus, the passage portion 12 may allow at least part of the visible light radiated onto the first surface 10A to pass through the passage portion 12 to the second surface 10B.

According to an embodiment, when the visible light VL deflected by the scanning unit 50 passes through the passage portion 12, the visible light VL can also be radiated onto the first detection unit 21 and the second detection unit 22, which are located on a line extending along the passage portion 12. Therefore, a worker (or a machine such as a robot) assembling the scanning device 1 can determine that the arrangement of the first detection unit 21 and the second detection unit 22 is appropriate if the worker can visually confirm the visible light VL passing through the passage portion 12 when positioning the substrate 10. In other words, provided that the worker assembling the scanning device 1 is able to see the visible light VL from the passage portion 12, the worker can determine that the position of the substrate 10 on which the first detection unit 21 and the second detection unit 22 are disposed is appropriate.

On the other hand, if the worker assembling the scanning device 1 is not able to visually confirm that some or all of the visible light VL deflected by the scanning unit 50 passes through the passage portion 12 when positioning the substrate 10, the worker can determine that the arrangement of the first detection unit 21 and the second detection unit 22 is not appropriate (that is, with the arrangement, the first detection unit 21 and the second detection unit 22 are not able to detect the visible light VL). In other words, the worker assembling the scanning device 1 can determine that the position of the substrate 10 on which the first detection unit 21 and the second detection unit 22 are disposed is not appropriate if the visible light VL cannot be seen from the passage portion 12. In this case, the worker assembling the scanning device 1 may correct the position of the substrate 10 on which the first detection unit 21 and the second detection unit 22 are disposed by shifting the position of the substrate 10 so that the visible light VL can be seen from the passage portion 12. Thus, according to the substrate 10 of an embodiment, the first detection unit 21 and the second detection unit 22 that detect electromagnetic waves in the scanning device 1 can be accurately positioned.

As described above, the presence of visible light VL passing through the passage portion 12 serves as an indicator for determining whether the visible light VL for detecting the irradiation direction of the electromagnetic waves used for scanning (i.e., detecting the swing angle of the reflecting mirror) is being correctly radiated to the first detection unit 21 and the second detection unit 22. Therefore, for example, if the width of the passage portion 12 illustrated in FIG. 4B (width in a direction perpendicular to the straight line α) is larger than the width of the first detection unit 21 and the second detection unit 22 (width in the direction perpendicular to the straight line α), an issue may arise. That is, the first and second detection units 21 and 22 may not necessarily be irradiated with the visible light VL even if the visible light VL passes through the passage portion 12. In such a case, the presence of such visible light VL may or may not serve as the indicator described above. Therefore, for example, as illustrated in FIG. 4B, the width of the passage portion 12 (width in a direction perpendicular to the straight line α) may be smaller than the width of the first detection unit 21 and the second detection unit 22 (width in a direction perpendicular to the straight line α).

Thus, the width of the passage portion 12 in a direction perpendicular to the straight line α may be smaller than the width of the first and second detection units 21 and 22 in a direction perpendicular to the straight line α.

The passage portion 12 of the substrate 10 can be realized in various forms. In short, the passage portion 12 of the substrate 10 can be made as appropriate as long as the visible light VL passing through the passage portion 12 can be confirmed visually.

As illustrated in FIGS. 1 and 3, in the scanning device 1, the location to which the second electromagnetic waves (visible light VL) are guided by the waveguide unit 60 can be made to be a different from the irradiation range of the first electromagnetic waves (infrared radiation IR) output by the scanning unit 50 (i.e., the path of the first electromagnetic waves from the scanning unit 50). Therefore, as described above, the detection units 20 may detect the second electromagnetic waves VL guided by the waveguide unit 60 in a different direction from the irradiation direction of the first electromagnetic waves (infrared radiation IR). In this case, the detection units 20 may be positioned outside the irradiation range of the first electromagnetic waves (infrared radiation IR) output by the scanning unit 50 (for example, on the first surface 10A of the substrate 10).

Thus, the scanning device 1 can detect the visible light VL used for determining the swing angle of the scanning unit 50 in a different direction from the irradiation direction of the infrared radiation IR used for scanning. In other words, in the scanning device 1, the detection unit for the visible light VL is not disposed in the irradiation range of the infrared radiation IR. Therefore, the scanning device 1 can set a large irradiation range for the infrared radiation IR. Therefore, in the scanning device 1 according to an embodiment, the range across which electromagnetic waves are radiated can be secured or expanded.

Figure 5:
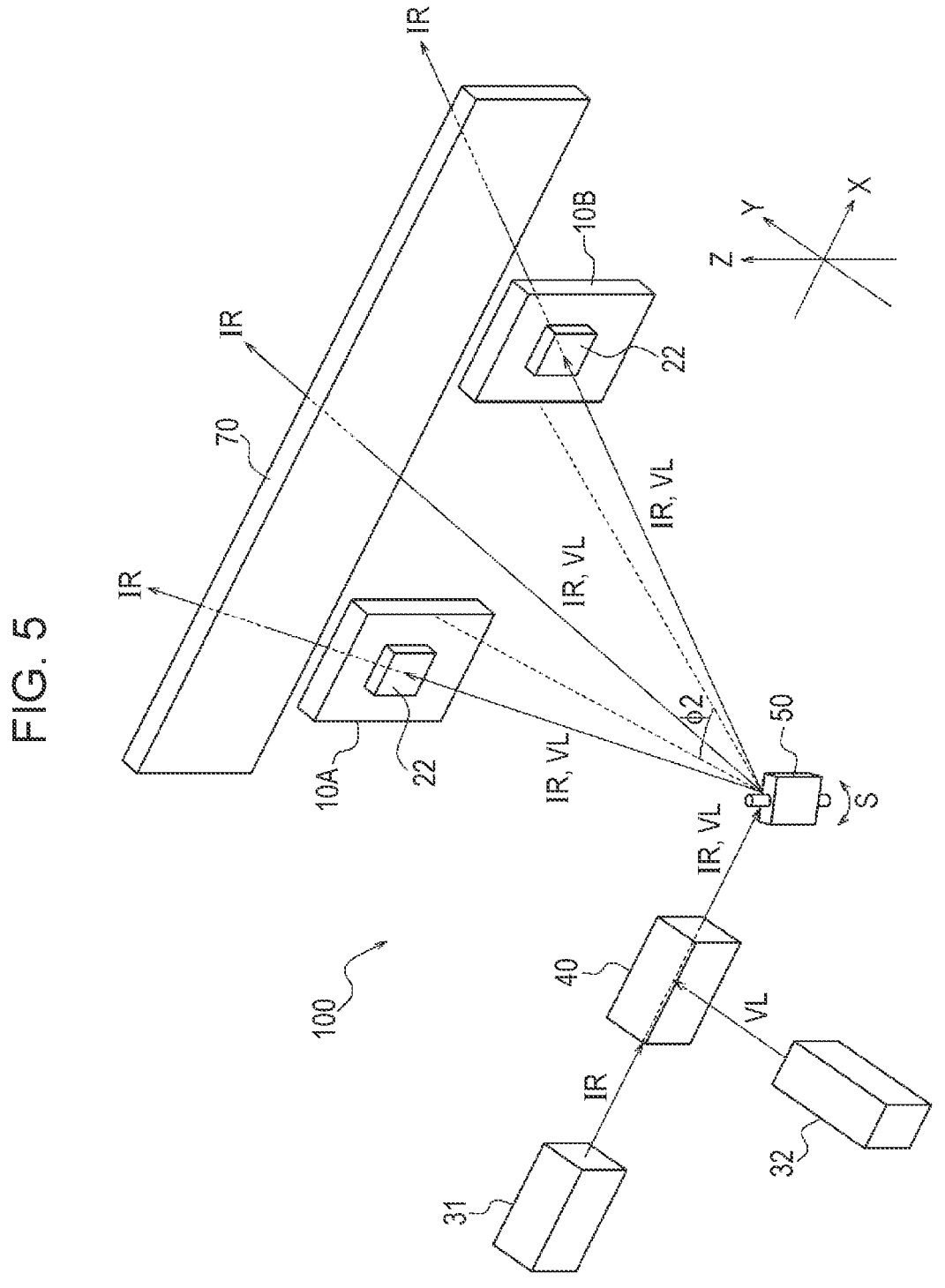
FIG. 5 is a diagram illustrating a schematic configuration of a comparative example for explaining effects of a scanning device according to an embodiment.

FIG. 5 illustrates a comparative example for describing the effects of the scanning device 1 according to an embodiment. A scanning device 100 illustrated in FIG. 5 differs from the scanning device 1 according to an embodiment mainly with respect to the absence of the waveguide unit 60 and the arrangement of the detection units 20. The scanning device 100 illustrated in FIG. 5 does not include the waveguide unit 60. Therefore, in the scanning device 100, the infrared radiation IR and the visible light VL radiated from the combining unit 40 to the scanning unit 50 are scanned in the same direction by the scanning unit 50. In this case, as illustrated in FIG. 5, the first detection unit 21 and/or the second detection unit 22 that detect the visible light VL output by the scanning unit 50 need to be installed within the range across which the infrared radiation IR is scanned by the scanning unit 50. Therefore, an irradiation range ϕ2 of the scanning device 100 illustrated in FIG. 5 is smaller than a range ϕ1 illustrated in FIG. 1. In other words, the scanning range of the scanning device 100 is smaller than the scanning range of the scanning device 1.

On the other hand, the scanning device 1 illustrated in FIG. 1 can detect the visible light VL for determining the swing angle of the scanning unit 50 in a different direction from the irradiation direction of the infrared radiation IR used for scanning. Therefore, in an embodiment, the scanning range of the scanning device 1 may be larger than the range ϕ1 illustrated in FIG. 1, for example. Thus, in the scanning device 1 according to an embodiment, the range across which electromagnetic waves are radiated can be secured or expanded.

In each of the above-described embodiments, a configuration is described in which the substrate 10 is provided with two detection units, namely, the first detection unit 21 and the second detection unit 22. However, to detect the visible light VL for detecting the irradiation direction of the electromagnetic waves or the swing angle of the reflecting mirror, the substrate 10 may be provided with only one detection unit 20 such as the first detection unit 21 or the second detection unit 22.

In this case, the scanning unit 50 may, for example, deflect the incident electromagnetic waves. The waveguide unit 60 may include, for example, a half mirror. In this case, the waveguide unit 60 may separate the electromagnetic waves deflected by the scanning unit 50 into first electromagnetic waves (infrared radiation IR) and second electromagnetic waves (visible light VL). One detection unit 20 may then detect the second electromagnetic waves (visible light VL) separated by the waveguide unit 60. Here, the detection unit 20 may be positioned outside the irradiation range of the first electromagnetic waves (infrared radiation IR) separated by the waveguide unit 60 from the electromagnetic waves deflected by the scanning unit 50.

In the embodiment illustrated in FIGS. 1 to 3, the substrate 10 is assumed to be disposed above the waveguide unit 60. Thus, the substrate 10 may be positioned above the plane containing the paths of the electromagnetic waves scanned by the scanning unit 50 (i.e., a plane parallel to the XY plane). In this case, the waveguide unit 60 may be disposed to guide the electromagnetic waves scanned by the scanning unit 50 upward toward the first detection unit 21 and/or the second detection unit 22.

On the other hand, in other embodiments, the substrate 10 may be disposed below the waveguide unit 60. In this case, a configuration may be adopted in which the top and bottom in the Z-axis direction are reversed in FIGS. 1 to 3. Thus, the substrate 10 may be positioned below the plane containing the paths of the electromagnetic waves scanned by the scanning unit 50 (i.e., a plane parallel to the XY plane). In this case, the waveguide unit 60 may be disposed to guide the electromagnetic waves scanned by the scanning unit 50 downward toward the first detection unit 21 and/or the second detection unit 22.

In the embodiment illustrated in FIGS. 1 to 3, the combining unit 40 is described assuming that the first electromagnetic waves radiated from the first irradiation unit 31 and the second electromagnetic waves radiated from the second irradiation unit 32 are combined by making the optical axes of the two sets of waves match each other. On the other hand, in other embodiments, the first electromagnetic waves radiated from the first irradiation unit 31 and the second electromagnetic waves radiated from the second irradiation unit 32 are not necessarily combined, and it is sufficient that the directions of travel of the two sets of electromagnetic waves match each other. For example, the first electromagnetic waves radiated from the first irradiation unit 31 and the second electromagnetic waves radiated from the second irradiation unit 32, which are output from the combining unit 40, may travel in parallel to the scanning unit 50.

The above embodiments have been described as representative examples, but it is clear to those skilled in the art that numerous changes and substitutions can be made within the spirit and scope of the present disclosure. Therefore, the present disclosure should not be interpreted as being limited by the embodiments described above, and a variety of variations and changes are possible without departing from the scope of the claims. For example, it is possible to combine a plurality of component blocks illustrated in the diagram of an embodiment into one component block, or to divide one component block into a plurality of component blocks.

REFERENCE SIGNS

1 scanning device
10 substrate
12 passage portion
21 first detection unit
22 second detection unit
31 first irradiation unit
32 second irradiation unit
40 combining unit
50 scanning unit
60 waveguide unit
70 emitting unit

The invention claimed is:
1. A scanning device comprising:
a first irradiation unit configured to radiate a first electromagnetic wave of infrared radiation for scanning an object of interest;
a second irradiation unit configured to radiate a second electromagnetic wave of visible light;
a scanning unit configured to deflect and output the first electromagnetic wave radiated by the first irradiation unit and the second electromagnetic wave radiated by the second irradiation unit;
a waveguide unit configured to guide the second electromagnetic wave output by the scanning unit in a second direction different from a first direction of the first electromagnetic wave; and
a detection unit configured to detect the second electromagnetic wave guided in the second direction by the waveguide unit,
wherein the waveguide unit allows the first electromagnetic wave radiated by the first irradiation unit to pass through the waveguide unit and reflects the second electromagnetic wave radiated by the second irradiation unit.
2. The scanning device according to claim 1,
wherein the detection unit is positioned outside an irradiation range of the first electromagnetic wave output by the scanning unit.

3. The scanning device according to claim 1, further comprising:

a combining unit configured to make a direction of travel of the first electromagnetic wave and a direction of travel of the second electromagnetic wave match each other, wherein the scanning unit deflects combined electromagnetic waves of the first electromagnetic wave and the second electromagnetic wave output from the combining unit.

4. The scanning device according to claim 3, wherein the combining unit is disposed at a position where the first electromagnetic wave radiated by the first irradiation unit and the second electromagnetic wave radiated by the second irradiation unit are incident on the combining unit.

5. The scanning device according to claim 1, further comprising:

an emitting unit configured to emit the first electromagnetic wave output by the scanning unit, wherein the waveguide unit is disposed at a position on a path of the first electromagnetic wave output by the scanning unit, the path extending up to the emitting unit through which the first electromagnetic wave is emitted.

6. The scanning device according to claim 1, wherein the first irradiation unit includes a laser diode configured to radiate the infrared radiation as the first electromagnetic wave.

7. The scanning device according to claim 6, wherein the second irradiation unit includes a laser diode configured to radiate the visible light as the second electromagnetic wave.

8. The scanning device according to claim 7, wherein the detection unit includes a photodiode configured to detect the visible light radiated by the second irradiation unit.

9. The scanning device according to claim 1, further comprising:

a controller configured to detect an angle of rotation of the scanning unit based on detection of the second electromagnetic wave by the detection unit, wherein the control unit is configured to detect the angle of the rotation based on a time elapsed from a timing at which the detection unit detects the second electromagnetic wave.

10. A distance measuring device configured to measure a distance to an object of interest, the distance measuring device comprising:

the scanning device according to claim 1.

11. The scanning device according to claim 1, wherein the waveguide unit is a cold mirror configured to guide the second electromagnetic wave in the second direction and pass the first electromagnetic wave through the waveguide unit in the first direction.

12. A scanning device comprising:

a scanning unit configured to deflect a combined electromagnetic wave of infrared radiation and visible light incident thereon;

a waveguide unit configured to separate the electromagnetic wave deflected by the scanning unit into a first electromagnetic wave of the infrared radiation and a second electromagnetic wave of the visible light; and a detection unit configured to detect the second electromagnetic wave output by the waveguide unit, wherein the detection unit is disposed at a position outside an irradiation range of the first electromagnetic wave output from the waveguide unit, wherein the waveguide unit allows the first electromagnetic wave to pass through the waveguide unit and reflects the second electromagnetic wave.

13. A scanning device comprising:

a first irradiation unit configured to radiate a first electromagnetic wave of infrared radiation for scanning an object of interest;

a second irradiation unit configured to radiate a second electromagnetic wave of visible light;

a scanning unit configured to deflect and output the first electromagnetic wave radiated by the first irradiation unit and the second electromagnetic wave radiated by the second irradiation unit;

a waveguide unit configured to guide the second electromagnetic wave output by the scanning unit in a second direction different from a first direction of the first electromagnetic wave;

a detection unit configured to detect the second electromagnetic wave guided in the second direction by the waveguide unit; and a controller configured to detect an angle of rotation of the scanning unit based on detection of the second electromagnetic wave by the detection unit, wherein the control unit is configured to detect the angle of the rotation based on a time elapsed from a timing at which the detection unit detects the second electromagnetic wave.

* * * * *